(12) United States Patent
LeMire et al.

(10) Patent No.: US 7,805,572 B2
(45) Date of Patent: Sep. 28, 2010

(54) CACHE POLLUTION AVOIDANCE

(75) Inventors: Steven Gerard LeMire, Costa Mesa, CA (US); Eddie Miller, Costa Mesa, CA (US); Eric David Peel, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 555 days.

(21) Appl. No.: 11/824,349

(22) Filed: Jun. 29, 2007

(65) Prior Publication Data

US 2009/0006761 A1 Jan. 1, 2009

(51) Int. Cl.
*G06F 12/00* (2006.01)
(52) U.S. Cl. .............................. 711/118; 711/3; 711/129
(58) Field of Classification Search .................. 711/118
See application file for complete search history.

(56) References Cited

U.S. PATENT DOCUMENTS

| | | | |
|---|---|---|---|
| 6,446,187 B1 * | 9/2002 | Riedlinger et al. .......... | 711/206 |
| 7,017,009 B2 * | 3/2006 | Okamura ..................... | 711/136 |
| 7,149,218 B2 * | 12/2006 | McBride et al. ............. | 370/392 |
| 2003/0103526 A1 * | 6/2003 | McBride et al. ............. | 370/466 |
| 2004/0078487 A1 * | 4/2004 | Cernohous et al. .......... | 709/245 |
| 2005/0055505 A1 * | 3/2005 | Day et al. .................... | 711/133 |

* cited by examiner

*Primary Examiner*—Jack A Lane
(74) *Attorney, Agent, or Firm*—Morrison & Foerster LLP

(57) ABSTRACT

Embodiments of the present invention are directed to a scheme in which information as to the future behavior of particular software is used in order to optimize cache management and reduce cache pollution. Accordingly, a certain type of data can be defined as "short life data" by using knowledge of the expected behavior of particular software. Short life data can be a type of data which, according to the ordinary expected operation of the software, is not expected to be used by the software often in the future. Data blocks which are to be stored in the cache can be examined to determine if they are short life data blocks. If the data blocks are in fact short life data blocks they can be stored only in a particular short life area of the cache.

28 Claims, 6 Drawing Sheets

CACHE POLLUTION AVOIDANCE

FIELD OF THE INVENTION

This invention relates to cache memory management in electronic systems, and more particularly to preventing cache memory pollution.

BACKGROUND OF THE INVENTION

Most computers and many electronic devices include a processor and a memory. The processor usually executes instructions and performs various operations on data. The instructions and data are usually obtained from the memory. The processor may also save data to the memory. Thus, the speed of communications between the processor and the memory is a very important factor contributing to the overall speed of the system.

Cache is a type of memory used to improve the speed of processor to memory communication. Cache memory is usually provided in addition to the ordinary or main memory of a computer or electronic device. Cache memory usually provides for much faster access to/from the processor than ordinary memory. Thus, the cache memory is usually placed in physical proximity to the processor, may be connected to the processor through a wider or faster connection, and may be configured for faster internal operation (e.g., higher clock rate). However, these benefits usually involve a trade-off-cache memory is usually more expensive than the main memory, and usually only a small amount of cache memory (as compared to the main memory) may be practicably used.

One intended purpose of cache memory is to temporarily hold data and/or instructions of the main memory which the processor is currently using. Thus, the processor may perform most memory access by communicating with the cache, which is faster than communicating with the main memory. Meanwhile, memory control logic may selectively load various values from memory to the cache and store various values of the cache back into main memory.

Usually, cache memory systems are designed to be invisible to the software running at the processor. Thus, they are designed so that the software itself does not have to load/store data to the cache/main memory, or keep track of whether certain data is in the cache or the main memory. Instead, the software usually addresses all data and instructions as if they are in main memory, and various cache controller electronics keep track of whether the data being accessed is in the cache, whether it should be moved to the cache and whether it should be stored into memory. Furthermore, cache systems are usually designed to be software independent as well. The above features are considered desirable for most systems in order to ensure processor/software independence. This may in turn provide for a wider degree of compatibility between different processors and different pieces of software.

Many complex systems have been designed in order to provide optimal cache operation. In general a cache controller will greatly improve the speed of the processor, if it can correctly predict what data will be used by the processor and keep that data in the cache. This, however, is a difficult task. As noted above, the size of the cache is limited in comparison to the main memory and thus the controller must be selective as to which data should be loaded into the cache.

If the processor attempts to access a memory address, the processor usually first checks the cache to determine if the memory address is already cached (i.e., a copy is stored in the cache). If that is the case then the processor may access the address relatively quickly from the cache. This result is referred to as a cache hit. If that is not the case, the processor must access the address at the main memory—a much more time intensive operation. This is referred to as a cache miss. In the case of a cache miss, the accessed memory address is usually loaded into the cache (often a block of adjacent memory is also loaded). This is done because often if the processor attempts to access a certain address, this is an indication that it will probably access that same address or other addresses adjacent to it again in the near future.

If the controller determines that a new block of data needs to be stored in the cache but the cache is already full, then the controller must remove or evict an existing block of data. However, doing so may actually decrease performance if the data block being evicted will be actually used more often by the processor in the immediate future than the new data block being added. Thus, many controllers use complex replacement algorithms to determine which blocks are to be left in the cache and which blocks are to be evicted to make space for the new blocks.

If the controller is not accurate at predicting which memory addresses will be accessed by the processor in the future and consequently does not keep these addresses in the cache, then the processor would likely experience a high number of misses. This would result in sharply decreased performance as the main memory would have to be accessed numerous times. This situation is often referred to as cache pollution, as it implies that a large number of useless entries (i.e., entries that are not often used by the processor) are being kept in the cache. The same situation is also some times referred to as cache thrashing as it often involves frequent loading and replacing of data into the cache as each cache miss causes new data to be loaded into the cache.

In practice, cache pollution often results when useful data blocks (i.e., data blocks that will be accessed by the processor often in the near future) are evicted from the cache to make room for relatively useless data blocks (i.e., ones that will not be accessed often in the near future).

However, it is difficult for a cache controller to predict which data block is useful and which useless. The cache controller is not aware of the future behavior of the processor. Thus, many existing cache controllers evict data blocks based on the time these data blocks were initially placed in the cache or the time they were last used by the processor. The software running on the processor may possess more accurate information as to which blocks of data are likely to be used by that software in the near future. But most existing systems do not allow this information to be used for cache management as the cache system is intended to be invisible to the software and not dependent on the software.

What is needed is a system which reduces cache pollution by better predicting which data blocks will be more or less frequently used by the processor in the near future. Further needed is a system that ensures that relatively useful data blocks will not be replaced in the cache by relatively useless data blocks.

SUMMARY OF THE INVENTION

Embodiments of the present invention are directed to a scheme in which information as to the future behavior of particular software is used in order to optimize cache management and reduce cache pollution. Accordingly, a certain type of data can be defined as "short life data" by using knowledge of the expected behavior of particular software. Short life data can be a type of data which, according to the ordinary expected operation of the software, is not expected to be used by the software often in the future.

Data blocks which are to be stored in the cache can be examined to determine if they are short life data blocks. If the data blocks are in fact short life data blocks they can be stored only in a particular short life area of the cache. Thus, data blocks in other areas of the cache will not be evicted to make space for short life data blocks.

According to some embodiments of the invention, the above functionality can be provided without modifying an existing cache and its controller.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of host bus adapters (HBAs), it should be understood that the present invention is not limited to host bus adapters, but is generally applicable to any devices that utilize cache memory.

Embodiments of the present invention are directed to a scheme in which information as to the future behavior of particular software is used in order to optimize cache management and reduce cache pollution. While, as discussed above, it is often considered desirable to keep the cache system independent of the software, this consideration is not as important in certain types of computing devices. For example, in embedded systems it is often known that a processor will usually run a certain type of software only. Thus, for example, the processor of a host bus adapter (HBA) can be reasonably expected to run firmware which processes networked communications. While different instances of firmware may be loaded in the same HBA, it can reasonably be predicted that every firmware that may be loaded on an HBA will perform roughly the same functions most of the time—i.e., receive network communications, process them and send them to the host's memory, or alternatively, receive communications from the host, process them and send them to the network. Similar predictions may be made for many other embedded systems that are intended to perform a narrow function, such as video cards, hard drive controllers, electronic cameras, set top boxes, DVD players, etc.

In the above cases as in many others, losing some of the independence between the cache system and the software using it may not be too detrimental and may provide significant benefits in terms of improved cache management.

Figure 1:
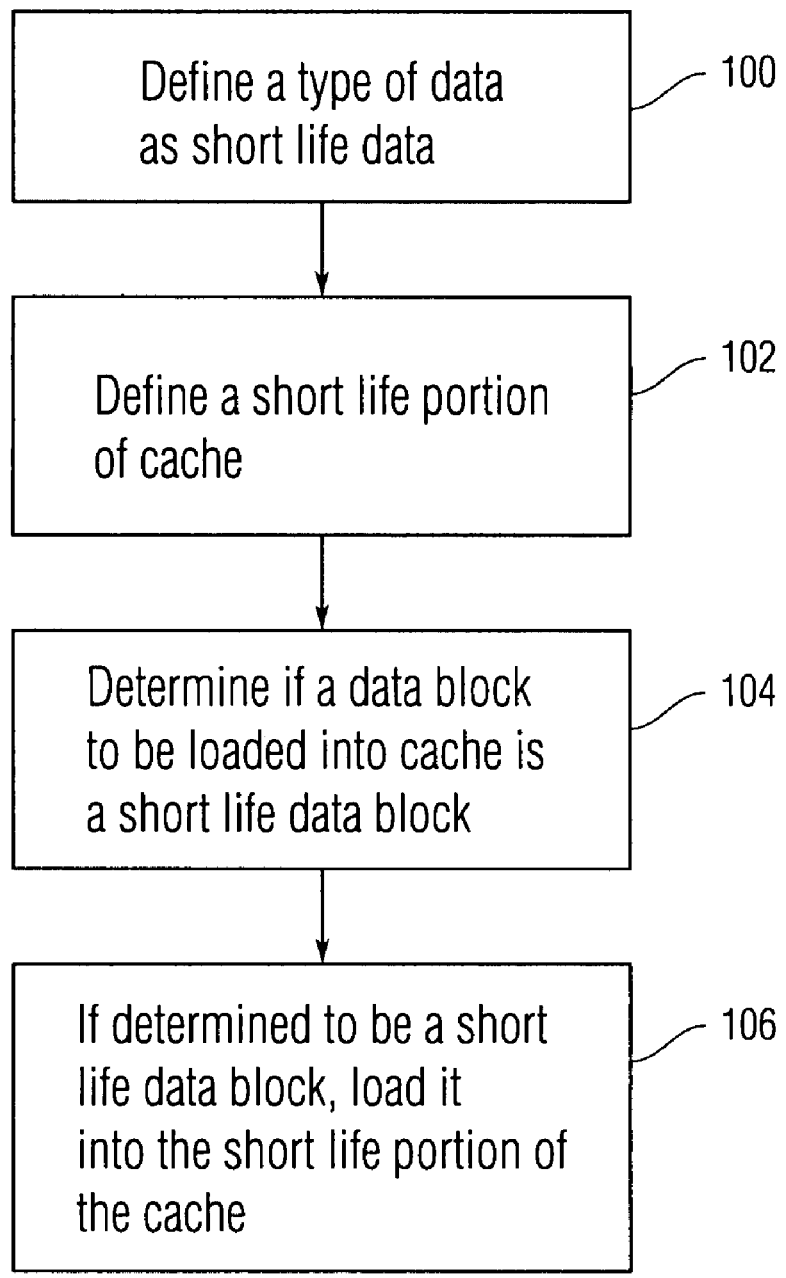
FIG. 1 is a flow chart showing a method for reducing cache pollution according to an exemplary embodiment of the present invention.

FIG. 1 shows a method of achieving the above according to some embodiments of the invention. In step 100 a certain type of data is defined as "short life data" by using knowledge of the expected behavior of the software running on the processor. Short life data is a type of data which, according to the ordinary expected operation of the processor, is not expected to be used by the processor often in the future.

For example, in the case of an HBA system, the processor is expected to process a stream of incoming packets. Each packet may be obtained from a network connection and loaded into the device memory (i.e., HBA memory) by dedicated HBA hardware. To process a packet, the HBA processor (or firmware running thereon) may access the header of a packet from the HBA memory, perform certain operations on the header and issue a bus command to load the packet into host memory. The location in host memory where the header is loaded may depend on the data within the header. In any event, once the packet is loaded into host memory, the header of that packet is probably unlikely to be needed again by the firmware. Thus, packet headers may be considered short life data for an HBA processor. They are usually processed once, sent off to the host and completely forgotten about by the HBA. It is very rare that a firmware will need to access a particular packet header after initially processing it. Thus, for most HBAs, it is safe to say that a particular packet header data is not data which is likely to be accessed often by the processor in the future, especially after the packet has been processed.

It should be noted that most embodiments of the present invention do not prevent short life data from being cached. Short life data may still be cached in order to improve access to it. For example, in an HBA it may be useful to keep a particular packet header in cache while the processor is processing that header. However, embodiments of the present invention provide a specific caching mechanism which makes it less likely that caching of short life data will result in the eviction of other more useful data.

At step 102, a portion of the cache memory is identified as a short life portion of the cache. In some embodiments, this may be a relatively small portion of the cache.

Steps 100 and 102 are preliminary steps and may be performed at the time of design or development. Steps 104, 106 may be performed at time of operation. In step 104, a data block which is to be loaded into the cache according to ordinary operation of the system is examined to determine whether that particular data block is a short life data block. Thus, in the example discussed above, if a data block to be loaded into cache comprises a packet header, then that data block is determined to be a short life data block. In step 106, if the data block is determined to be a short life data block, it is loaded in the short life portion of the cache.

Thus, according to the above described embodiment, short life data is only loaded into a specific predefined short life portion of the cache. Other presumably more useful data may be loaded in the remaining portion of the cache. Thus, the short life data is unlikely to replace, or evict the more useful data. Instead, the short life data is likely to only replace other short life data. As a result, cache pollution is significantly reduced.

It should be noted that, while it may be possible, it is not necessary that the short life portion of the cache be reserved exclusively for short life data. Thus, in some embodiments, other data may also be placed in that portion of the cache. This may be beneficial during periods of operation when short life data is not being processed. For example, if the HBA discussed above goes through a period when it does not process any network packets (e.g., when performing self diagnostics), then it may be beneficial for other data to be placed in the short life portion of the cache.

In some embodiments, the short life portion of the cache may be comparatively small, thus further reducing cache pollution. For example, if it is known that during usual operation the processor will only process a single block or a small number of blocks of short life data at a time, the short life portion of the cache may be reduced to the size of a single block or a small number of blocks. Thus, continuing with the HBA example, if it is known that the firmware processes a single packet header at a time, (i.e., it does not pick up a subsequent header until it is finished with the current header) then the short life portion of the cache may be reduced to the size of a single header only. This will provide more space in the cache for other, presumably more useful data, thus further reducing cache pollution.

A person of skill in the art would recognize that existing cache controllers may be modified to comply with the method of FIG. 1. Specifically, they may attempt to recognize which incoming data blocks are short life data, and to place these data blocks into a predefined short life portion of the cache.

However, modifying the cache controller is not practicable in many situations. The cache controller is often provided as a part of a processor. Processors—even embedded processors—are often very complex circuits used in a variety of different applications. For example, an HBA may utilize an ARM™ processor. The same type of ARM processor may be used in other completely different applications, such as, for example, DVD players, industrial robots, cars, game consoles, etc. It is apparent that these different applications would usually entail a different definition of what short life data is.

Thus, if the cache controller has to be modified for the purposes of implementing the present invention, then, for many types of processors, the actual processor has to be customized for a particular application. Since processors are very complex circuits, this is usually considered cost prohibitive.

Thus, according to some embodiments of the present invention, the method of FIG. 1 may be implemented without actually modifying the cache controller and the processor itself. In other words, other components, such as the software and additional hardware connected to the processor may be provided or modified in order to cause an ordinary prior art cache controller to perform the method of FIG. 1.

Figure 2:
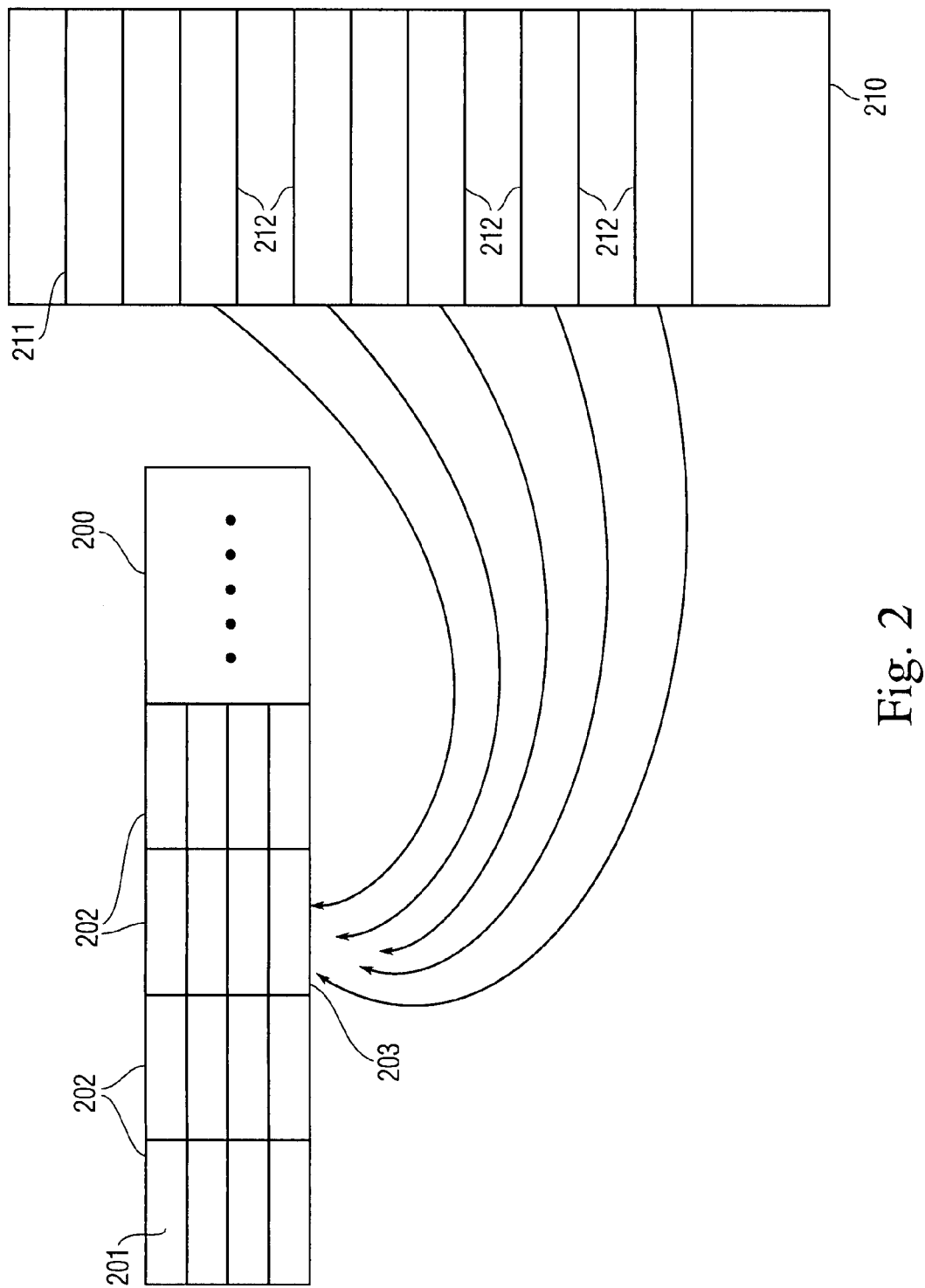
FIG. 2 is a diagram illustrating the operation of an exemplary cache system.

In order to describe these latter embodiments, the structure of an existing type of a cache system is explained in detail below with reference to FIG. 2. For the purposes of illustration, the cache memory is shown as a matrix where each column of the matrix represents an index into the cache. It is assumed that the cache controller will select a cache index based on a subset of bits from the memory address of the data being cached. The rows of the matrix represent the number of different memory blocks that can be in cache simultaneously that map to the same index. A cache memory 200 may be used to cache data from main memory 210. The cache memory may include a plurality of blocks, such as block 201. The blocks may be used to store a predetermined amount of sequential data from the main memory 210. In other words, the blocks are moved between the cache and the main memory as a whole, they are not split up. Thus, for example, block 211 of the main memory may be cached by copying its data into block 201 of the cache.

Figure 3:
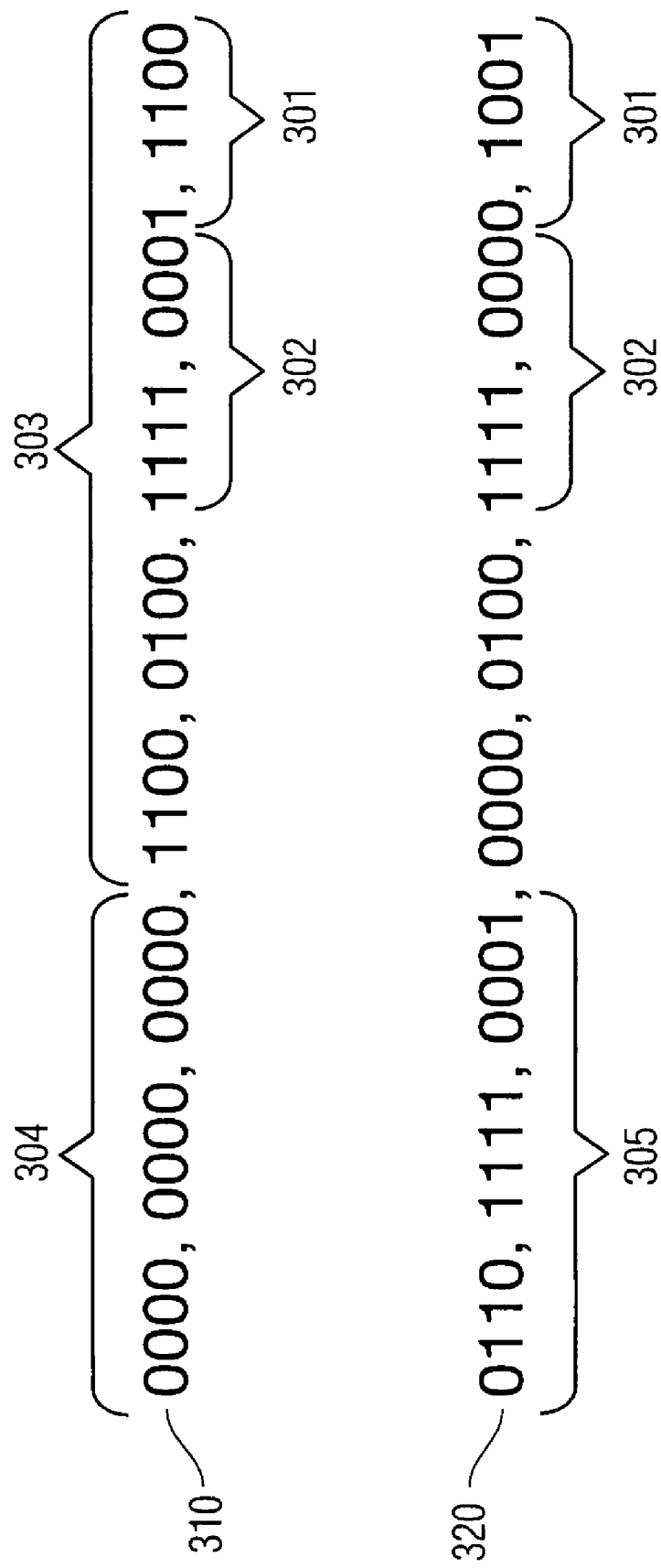
FIG. 3 is a diagram showing an exemplary memory address of a byte in a main memory according to embodiments of the invention.

FIG. 3 is a diagram showing an exemplary memory address 310 of a byte in the main memory 210. Address 310 is a 32 bit address, but persons of skill in the art would recognize that the teachings discussed herein may be applied for other address lengths. Since the blocks are transferred into the cache 200 without changing the order of the data within them, the last bits of the memory address of a byte stored in the main memory 210 may be used to reference the location of that byte within a cache block, such as block 201. Thus, if the blocks are, for example, 32 bytes long each, then the last 5 bits of an address 301 may designate the location of a byte within the cache block.

In theory a cache management system can copy any block from main memory into any block of the cache. However, in practice this has been discovered to be too cumbersome. Therefore, many current cache systems use a portion of the memory address of data within a block in order to determine which column 202 the block will be placed in. For example, if the cache 200 has 128 rows, then (referring back to FIG. 3) the 7 bits 302 may be used to define which column the block will be placed on. Note that in the present example bits 302 will be identical for the addresses of all bytes within a block. Only bits 301 will change among the addresses of the bytes within a block.

Thus, each column (or index) 202 of the cache may be associated with a unique combination of bits 302. However, there may be many addresses in the main memory 210 that share the same bits 302. Thus, there may be many different blocks which are supposed to be stored in a particular column 202. For example a plurality of blocks 212 may be associated with a single column 203 of the cache (in practice there are usually many more main memory blocks associated with a single cache column). Thus, if two or more blocks 212 need to be cached the cache management system will use different blocks within the column 203 to store them. However, a cache memory has a limited number of rows. For example, cache memory 200 has four rows (for this reason, it may be referred to as "4-way associative cache"). Thus, if all the blocks within column 203 are taken and a new block associated with that column needs to be cached, then the cache manager will evict one of the existing cache entries in the column to make space for the new one. According to the present cache system example, the cache manager is not allowed to save a block in another column (i.e., a column which is not associated with the bits 302 of the addresses of that block). This rule holds for many existing cache systems in order to simplify the design of the cache controller.

Thus, for the presently discussed cache system and many more like it, main memory blocks 212 can only be cached in column 203 and nowhere else. This peculiar feature of many existing cache systems may be advantageously utilized for the purpose of embodiments of the present invention. Namely, the method of FIG. 1 may be implemented with the cache system of FIG. 2 without necessitating any modifications of the cache controller. More specifically one or more columns of the cache (e.g., column 203) may be designated to be used for short life data in the cache. Then, according to embodiments of the invention, it may be ensured that the short life data blocks are only stored in locations associated with column 203 (i.e., locations 212). Then, the short life data blocks will only be loaded in the short life portion of the cache as required by step 106 of FIG. 1. Thus, the method of FIG. 1 is implemented without modifying the cache controller for cache 200.

However, it is highly unlikely that all of the short life blocks will naturally map to the same cache index so an external mechanism is needed. For example, referring to the HBA example, an HBA may need to store a large number of packet headers (e.g., short life data) during network communications. Thus, the limited number of spots 212 in the main memory available for storage of short life data may not be enough. Furthermore, the mechanism (be it software or hardware) necessary for determining whether certain incoming data is short life data and then storing it in one of the designated locations 212 may be too complex.

Figure 4:
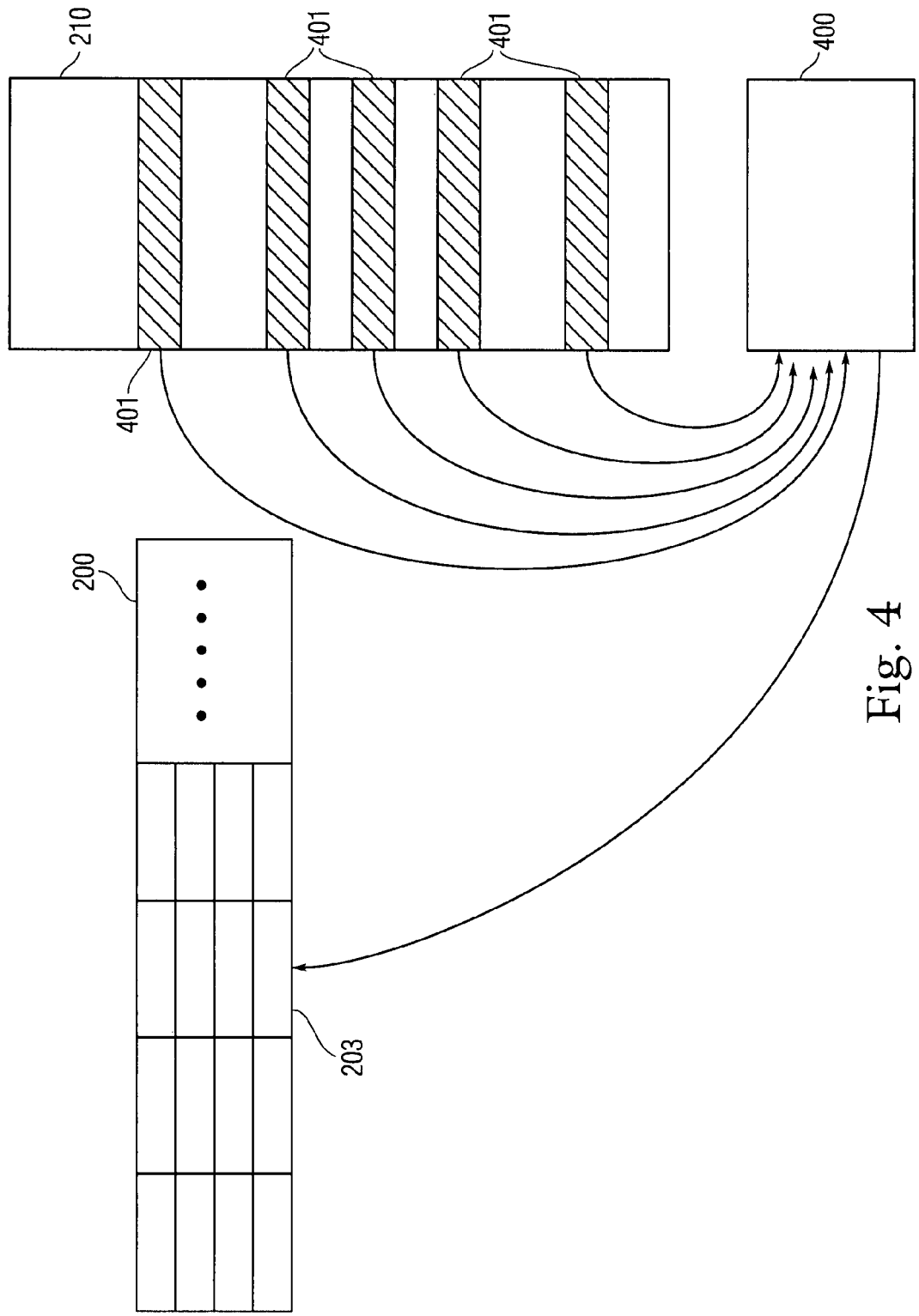
FIG. 4 is a diagram illustrating the use of virtual memory addresses according to exemplary embodiments of the present invention.

FIG. 4 shows how other embodiments of the present invention solve the above problems. In FIG. 4, main memory 210 may hold various blocks of short life data 401. In the presently discussed embodiments, there need be no restriction as to where the blocks of short life data are stored within the main memory (as opposed to the embodiments discussed above).

To ensure that the short life data blocks are limited to the short life portion of the cache (i.e., column 203) the short life data blocks are associated with virtual addresses. Each virtual address may be such that it is associated with column 203 by the cache controller. Consequently the virtual addresses may be used when referring to the short life data blocks in communications that go through the cache controller. As discussed above, in the present embodiments the cache controller is not modified for the purposes of the present invention. Thus, the cache controller treats the virtual addresses as real addresses. Therefore, when the cache controller decides to places one of the short life blocks 401 in the cache, it determines the column that block should be placed in according to the virtual address. Since the virtual address is always associated with the short life portion of the cache (i.e., column 203), the cache controller will limit the placement to all short life blocks to the short life portion of the cache. Thus, the method of FIG. 1 may be executed without modifying the cache controller and without placing complex rules as to where short life blocks can be placed in main memory (as in the embodiments discussed above).

With reference to FIG. 4, address space 400 is a virtual address space including the virtual addresses. In other words, address space 400 is not associated with any actual portion of main memory 210 or any other memory and it is not capable of holding any data. It is a mere abstraction indicating that some data may be assigned with virtual addresses. When data blocks 401 are assigned virtual addresses, they appear to the cache controller to be stored in the virtual address space 400. Thus, when the cache controller caches any of these data blocks, it places them in a column associated with the virtual address space. And, as noted above, the virtual address space is associated only with column that are part of the short life portion of the cache (i.e., column 203). Thus, the cache controller places all blocks 401 appearing to be from address space 400 into column 203.

Referring back to FIG. 3, the virtual address space may be defined by using address values that are not used for referencing the main memory. For example, if the main memory is 1 MB in size, then only the 20 right most digits 303 of address 310 may be needed to address actual memory. The left 12 digits 304 may be left at "0" for all real memory addresses, such as address 310. The virtual address space may be such that for all addresses within it the digits 304 are of a predefined virtual address prefix, different than the one used for real addresses. Thus, a virtual address 320 may be identified by an alternative virtual address prefix, such as, for example, prefix 305.

The region 302 of the virtual address is limited to those values which map that virtual address to the short life portion of the cache (e.g., column 203). Thus, if the short life portion of the cache comprises only one column there is only one allowable value for the region 302 of a virtual address. If the short life portion comprises two columns there are two allowable values, etc.

Figure 5:
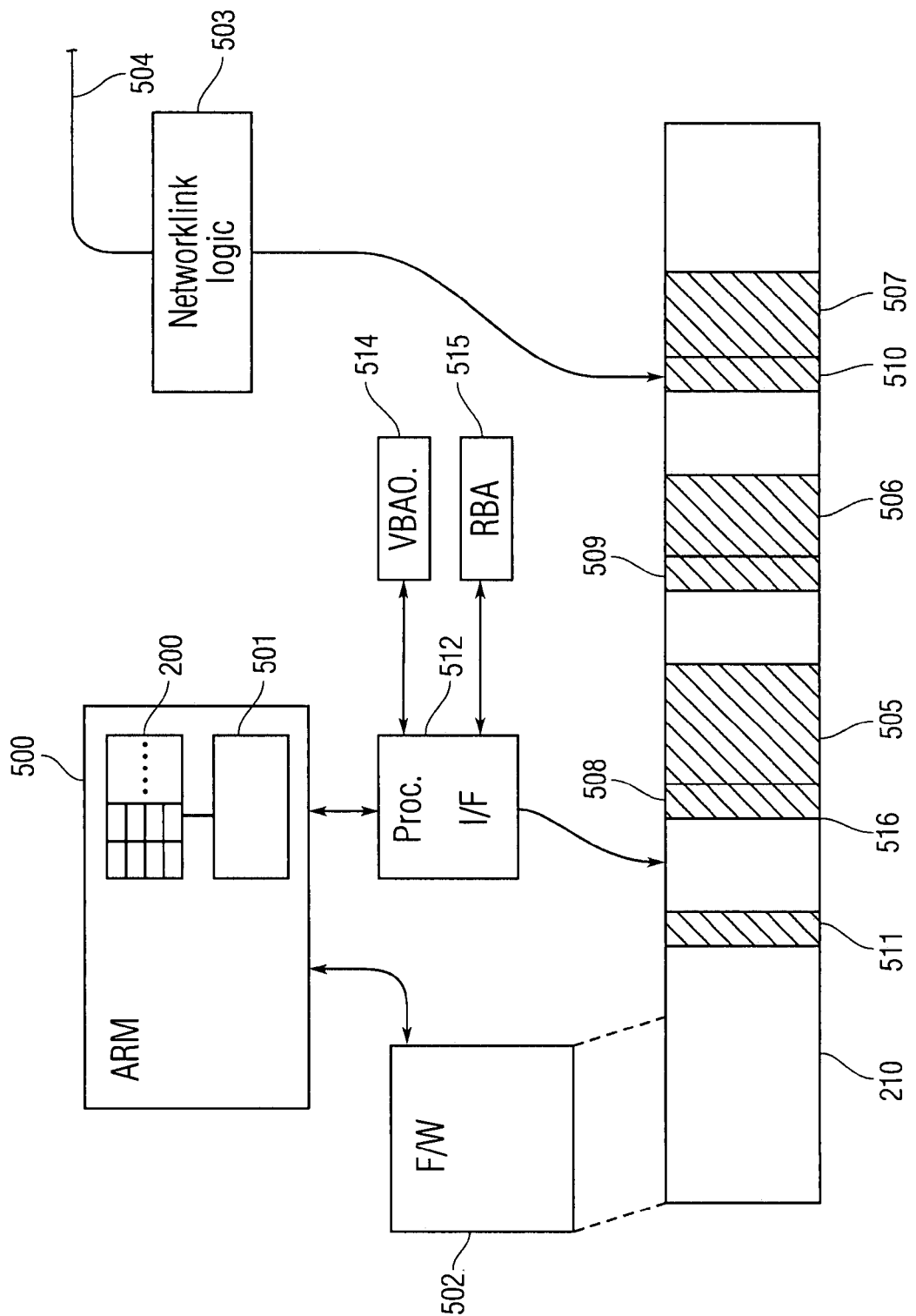
FIG. 5 is a diagram showing an HBA adapter according to exemplary embodiments of the present invention.

FIG. 5 is a diagram showing an HBA adapter according to embodiments of the present invention. The HBA adapter includes a processor 500. The processor may be, for example, an embedded ARM processor. The processor may include the cache 200 and a cache manager 501 (in some embodiments the cache may be provided separately from the processor). Software 502 is executing at the processor. The software may be, for example, HBA firmware. The firmware is shown as a separate entity, but it may be stored in the main memory 210, or in a separate memory such as dedicated firmware non-volatile memory.

Network link logic 503 may be connected to a network link 504. The network link logic may receive data from the network link, form it into packets and save the packets into memory. Thus, packets 505, 506 and 507 may be placed into memory. These packets may include headers 508, 509 and 510, respectively.

The network link logic may also save or modify reference data 511 which is used to inform the firmware when and where packets are saved. In some embodiments, the packets may be saved in a continuous buffer, and the reference data may simply include pointers referring to the beginning and end of the buffer.

A processor interface 512 is provided for converting virtual addresses into real addresses. The processor interface may be a hardware component which is specifically designed for the purposes of embodiments of the present invention. The processor interface is usually not part of the processor. Thus, the processor need not be modified for the purposes of the present embodiments of the invention. The processor interface is connected to the address bus of the processor, so that memory requests issued by the processor pass through the processor interface.

Two registers are also provided. These may be the virtual base address offset (VBAO) register 514 and the real base address (RBA) register 515. The VBAO register holds a value used to identify virtual address. In some embodiments, this may be the virtual address prefix 305 (see FIG. 3). The value of the VBAO register is usually set during configuration of the HBA and usually does not change during normal operation. The RBA register holds a value which is used to associate a currently used set of real addresses with their respective virtual addresses. In some embodiments, the VBAO and RBA registers may not be registers but values stored in the main memory.

In ordinary operation, the firmware 502 processes the various packets placed in memory by the network link logic 503. Usually the firmware does not need to process the packet bodies, only packet headers (such as headers 508, 509 and 510). The firmware accesses the reference data 511 to determine which packets are pending for processing.

The firmware may determine, for example, to process packet header 508 of packet 505. The firmware determines the location of packet header 508 by accessing the reference data 511. This may be location 516.

However, according to the present embodiments, the firmware does not immediately access location 516. If the firmware did that, location 516 would be accessed by the processor 500 (as the firmware is executed by the processor). The cache controller 501 would then process the request for that location and may save the incoming data (i.e., parts of the header 508) into the cache. This would be undesirable, because, as noted above, the header may be considered to be short life data and on that case its location in the cache may need to be controlled. But since location 516 is a real address, its associated location in the cache may be different than the short life portion of the cache.

Therefore, instead of directly accessing header 508 at location 516, the firmware 502 initiates a procedure for setting up a virtual address for header 508. The firmware first determines the real base address of header 508. The real base address may be the address of the first byte of the header (i.e., address 516). The firmware then saves the real base address in the RBA register 515.

The firmware may then access one or more bytes of the header 508 by converting their real addresses into virtual addresses. To compose a virtual address, the firmware obtains the virtual address prefix from the VBAO register 514. It places the prefix in the most significant portion of the virtual address 305. The firmware then places a predefined cache association string into the virtual address. The cache association string may be a value for the bits 302 which are used to associate an address with a particular column in memory. The predefined cache association string is such that it associated the virtual address with a column of cache which has been previously designated as belonging to a short life portion to the cache (e.g., column 203 of FIGS. 2 and 4).

The firmware then places in the least significant bits of the virtual address 301 an offset identifying the position of the particular byte of the header as measured from the beginning of the header (or from the real base address, if different than the beginning of the header). Thus, if the firmware is attempting to access the first byte of the header, it may use "00000" as string 301. If it is trying to access the ninth one, it may use "01001" (as in the example virtual address 320 of FIG. 3). The other portions of the virtual address may be left as "0"s.

Once a virtual address is formed, the firmware performs an instruction causing the processor to attempt to access memory at that address. If the processor was allowed to access memory directly, an error would occur, because no actual memory exists at the virtual memory address. However, the processor interface 512 intercepts the processors request to access memory. It obtains the virtual address from that request and initiates a procedure to convert that virtual address back into a real address.

For that purpose, the processor interface obtains the value of the RBA register and adds it to the least significant bits 301 of the virtual address. The resulting value is the real address of the value being accessed. The processor interface then accesses a value within the header 508 based on the real address and forwards it onto the processor, in response to the processor's request. Thus, from the processor's point of view, it appears that the value provided by the processor interface was actually stored at the virtual address.

Since the processor is executing a memory access instruction, the cache controller 502 may decide to load the accessed value into cache. If that is the case, the cache controller will usually also load a block of values proximate to the accessed value into cache. It should be noted, however, that in order for this load to take place, the cache controller must not be under the impression that the virtual address is already loaded in the cache. Thus, the software must invalidate the entry associated with the virtual address prior to referencing the new block with the same address. This works to the advantage of this invention in that if the previous instance of data is invalidated immediately prior to the new instance using the same virtual address, there will be an empty entry available when the new instance is loaded into cache. This eliminates the need to evict a possibly useful block.

The cache controller is only aware of the virtual address of the value being accessed. It will therefore determine which column that value (as well as the block of proximate values) is entered into based on its virtual address. This is advantageous as the virtual address is configured (by placing a proper predefined cache association string into bits 302) so that it is associated with the short life portion of the cache. Thus, the cache controller is guaranteed to place the accessed values from the header 516 (i.e., a short life data) in the short life portion of the cache.

The software may create additional virtual memory addresses and use them to access memory when attempting to load an entire block into cache. If they refer to the same cache block, there is no need to do any more. The cache block will already be loaded. However, some embodiments of this invention will allow the virtual address space to encompass multiple cache blocks. If so, multiple short life cache blocks can be present simultaneously. Thus, the cache controller may take the virtual memory address used by the firmware, then modify the least significant digits 301 to compose other addresses. If so, there is no need to access the memory since the cache block has already been loaded. If bits other than 301 are changed in the new address, a new cache block will be loaded. The software is required to remember which blocks are in use and which are not and manipulate the cache controller accordingly. Naturally, in this case the cache controller is not "aware" it is dealing with virtual memory addresses, and treats these addresses like any other addresses. In this event, the processor interface will intercept the requests from the cache controller, translate these other virtual addresses into real addresses, access the relevant values, and forward the results to the cache controller. In this manner, the cache controller may load the entire header 508 into memory.

The firmware may process header 508 and, when done, forward the header along with the rest of the packet 505 to the host. The firmware may then repeat the above described process for another header, such as header 509. Accordingly, once the firmware changes the RBA register, the virtual addresses will reference data in header 509, etc.

In order to process header 509 using the same virtual address, the cache blocks used by header 508 must be invalidated. This is usually accomplished by the software accessing the cache controller in a way that forces an eviction of the virtual address block from the cache. In addition, the software may first "clean" the cache block in case it was made "dirty" through a write operation to the address range while it was in cache. This should not be problematic as the firmware has already processed header 508 and sent it to the host. Therefore, it does not need it in cache. Thus, according to an embodiment of the present invention, the size of the short life portion of the cache may be set at or close to the size of a single header. If the size of the short life block is not an integer multiple of the cache block size, very special care must be taken to avoid cache coherency issues.

Limiting the short life area of cache to the size of a single header, may not slow down the processing of headers, if the firmware is programmed to handle headers in a strictly sequential manner. In other words, if the firmware is programmed to access a subsequent header only after it has finished all processing of a current header, then limiting the short life area of cache to the size of a single header should not have significant negative effects on performance. In such a case, eviction of the previous header by the subsequent header is not a problem, because once the subsequent header is accessed, the previous one is no longer needed.

In some implementations, embodiments of the invention may be used for creating headers for outgoing network communications instead of or in addition to processing incoming headers. In order to optimize access to memory, it could be beneficial to use the virtual address to define an area in which to build the header and to force the header to the real memory by use of a "clean" operation on the cache block.

As noted above, embodiments of the present invention may also be used for other implementations that are not related to the processing of headers or even network communications. For example, any system that utilizes cache and for which a set of short life data can be identified may benefit from embodiments of the present invention.

Thus, according to the above discussed embodiments, previously defined short life data may be advantageously placed only in a limited predefined short life portion of the cache. Thus, short life data is less likely to evict more useful data from the cache thus causing cache pollution. Furthermore, according to embodiments of the invention, the above advantages may be obtained without modifying the processor and/or the cache controller.

Figure 6:
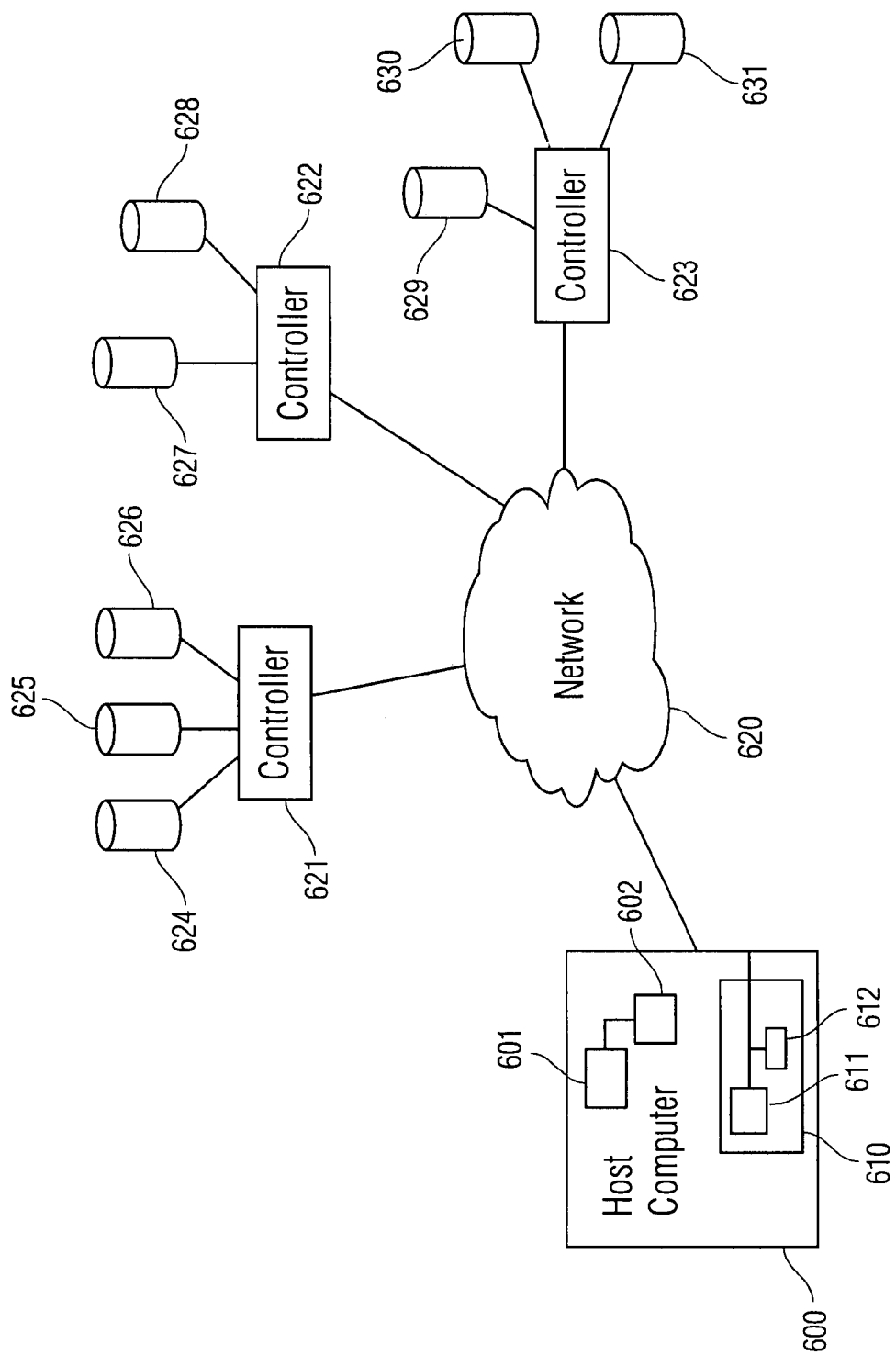
FIG. 6 is a diagram of exemplary embodiments of the present invention.

FIG. 6 is a diagram of exemplary embodiments of the present invention. A host computer 600 may be provided. The host computer may include a processor 601 and memory 602. The memory may include host software. The host computer can also include an HBA 610. The HBA can be an HBA similar to the one described above in connection with FIG. 5. The HBA may include an embedded processor 611 and HBA memory 612. The HBA memory may also include software such as, for example, HBA firmware. The present invention can be implemented at the HBA in order to improve the efficiency of a cache at the HBA embedded processor 611. It may also be implemented at the host computer in order to improve the efficiency of a cache at the host processor 601. Alternatively, the invention can be implemented both at the host computer and the HBA.

The host computer 600 can have various different functions. In one embodiment, the host computer may be a part of a storage area network (SAN). The SAN can include a network component 620, a plurality of controllers 621-623, and a plurality of disc drives 624-631 connected to the various controllers. The controller may include HBAs similar to HBA 610. Thus, the HBAs of the controllers may also feature the improved cache control systems and methods discussed herein.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for operating a cache memory, comprising:
defining a type of data as short life data according to an expected operation of particular software, wherein the short life data is data that is anticipated to be used by the processor only for a short amount of time;
defining a short life portion in the cache memory;
determining whether a data block to be cached is a short life data block; and
in the event that the data block to be cached is a short life data block, storing the data block to be cached only in the short life portion of the cache memory so that useful data in other portions of the cache memory is not to be replaced by the short life data, the short life portion being a portion of the cache memory that does not encompass the entire cache memory.

2. The method of claim 1, wherein determining whether a data block to be cached is a short life data block includes determining whether all data in the data block to be cached is short life data.

3. The method of claim 1, wherein the short life portion of the cache memory is less than one quarter of the total size of the cache memory.

4. The method of claim 1, wherein the method is performed without modifying a standard cache controller.

5. The method of claim 1 further, including:
receiving an actual memory address of a data item to be cached that is part of the data block to be cached;
translating the actual address to a virtual address, the virtual address being associated by a cache controller with an area of the cache that is the same as or part of the short life portion of the cache;
instructing a processor to access memory at the virtual address;
sending a memory access command based on the virtual address by the processor to the memory;
interrupting the memory access command before it reaches the memory;
removing the virtual address from the memory access command and replacing it with the actual address; and
sending the access command to the memory.

6. The method of claim 5, wherein the instructing a processor to access memory at the virtual address causes a cache controller to store the accessed memory in the short life portion of the cache based on the virtual address.

7. The method of claim 1 wherein the short life data comprises network communications data.

8. The method of claim 7 wherein the short life data block comprises the header of a network communications packet.

9. The method of claim 1, further comprising caching data blocks that are not short life data blocks, wherein said data blocks are not restricted to the short life portion of the cache.

10. A system comprising:
a processor including a cache memory and a cache memory controller; and
a memory including one or more data blocks including at least one short life data block, the short life data block comprising short life data defined according to an expected operation of particular software, wherein the short life data is data that is anticipated to be used by the processor only for a short amount of time,
wherein the cache controller is configured to determine the short life data block from the one or more data blocks and store the short life data block only in a specific short life portion of the cache memory so that useful data in other portions of the cache memory is not to be replaced by short life data, the short life portion being of a lesser size than the entire cache memory.

11. A host bus adapter comprising the system of claim 10.

12. A computer comprising the system of claim 10.

13. A storage area network comprising the system of claim 10.

14. A system comprising:
a processor including a cache memory and a cache memory controller; and
a memory including one or more data blocks including at least one short life data block, the short life data block comprising short life data defined according to an expected operation of particular software, wherein the short life data is data that is anticipated to be used by the processor only for a short amount of time,
wherein the processor is configured to access the data blocks in the memory and cause the cache controller to determine the short life data block from the one or more data blocks and store the short life data block only in a specific short life portion of the cache memory so that useful data in other portions of the cache memory is unlikely to be replaced by short life data, the short life portion being of a lesser size than the entire cache memory.

15. A host bus adapter comprising the system of claim 14.

16. A computer comprising the system of claim 14.

17. A storage area network comprising the system of claim 14.

18. A system comprising:
a processor including a cache memory and a cache memory controller;
a memory including one or more data blocks including at least one short life data block, the short life data block comprising short life data defined according to an expected operation of particular software, wherein the short life data is data that is anticipated to be used by the processor only for a short amount of time, the memory further including computer executable instructions; and
a processor interface circuit coupled to the processor,
wherein the computer executable instructions, when executed at the processor, cause the cache controller to determine the short life data block from the one or more data blocks and store the short life data block only in a specific short life portion of the cache memory so that useful data in other portions of the cache memory is not to be replaced by short life data, the short life portion being of a lesser size than the entire cache memory.

19. The system of claim 18, wherein the computer executable instructions, while executed at the processor, cause the processor to:
associate an actual memory address of the short life data block with a virtual address; and
generate a memory access command to access the virtual address.

20. The system of claim 19, wherein the processor interface circuit is configured to:
intercept the memory access command referencing the virtual address and issued by the processor;
modify the memory access command by replacing the virtual address with the actual address of the short life data block in the memory access command; and
send the modified memory access command to the memory.

21. A host bus adapter comprising the system of claim 18.

22. A computer comprising the system of claim 18.

23. A storage area network comprising the system of claim 18.

24. The system of claim 18 further comprising:
a network interface; and
a network link logic,
wherein the one or more data blocks comprise network communications data received through the network interface and stored in the memory by the network link logic.

25. The system of claim 24, wherein the short life data block comprises headers of network communication packets.

26. A computer readable medium comprising computer executable instructions, said computer executable instructions, while executed at a processor, causing the processor to:
identify a data block as a short life data block;
translate an actual memory address of the short life data block into a virtual address, the virtual address being associated with a short life area of a cache memory, the short life area being smaller than the entire cache memory; and
attempt to access the short life data block using the virtual address, thus ensuring that in the event it is loaded into cache memory, the short life data block will be loaded into the short life area of the cache memory.

27. The computer readable medium of claim 26, wherein the processor is an embedded processor and the computer executable instructions are firmware.

28. The computer readable medium of claim 26, wherein the computer executable instructions are further configured to cause the processor to save an offset address in a register, the offset address being associated with an actual address of the short life data block and the virtual address, so that the actual address of the short life data block may be obtained from the virtual address and the offset address.

* * * * *